United States Patent
Kwon

(10) Patent No.: US 6,736,756 B2
(45) Date of Patent: May 18, 2004

(54) SHIFT CONTROL APPARATUS OF AUTOMATIC TRANSMISSION AND METHOD THEREFOR

(75) Inventor: Jun-Eui Kwon, Seoul (KR)

(73) Assignee: Hyundai Motor Company, Seoul (KR)

( * ) Notice: Subject to any disclaimer, the term of this patent is extended or adjusted under 35 U.S.C. 154(b) by 15 days.

(21) Appl. No.: 10/003,275

(22) Filed: Dec. 6, 2001

(65) Prior Publication Data

US 2002/0098945 A1 Jul. 25, 2002

(30) Foreign Application Priority Data

Dec. 6, 2000 (KR) ........................ 2000-73887

(51) Int. Cl.$^7$ ................... F16H 59/64; F16H 61/00
(52) U.S. Cl. ........................... 477/98; 477/117
(58) Field of Search ..................... 477/97, 98, 121, 477/122, 123, 156, 117

(56) References Cited

U.S. PATENT DOCUMENTS

| | | | | |
|---|---|---|---|---|
| 5,558,597 A | * | 9/1996 | Oba et al. ................. | 477/98 |
| 5,733,220 A | * | 3/1998 | Iizuka .................... | 477/156 X |
| 5,749,802 A | * | 5/1998 | Tanahashi et al. .......... | 477/117 X |
| 5,792,022 A | * | 8/1998 | Hisano et al. ............. | 477/117 X |
| 5,833,572 A | * | 11/1998 | Leising et al. ............ | 477/113 |
| 5,947,856 A | * | 9/1999 | Tabata et al. ............. | 477/98 X |

* cited by examiner

*Primary Examiner*—Roger Pang
(74) *Attorney, Agent, or Firm*—Antonelli, Terry, Stout & Kraus, LLP

(57) ABSTRACT

A shift control apparatus of an automatic transmission of a vehicle and a method therefore is disclosed, the method comprises the steps of: discriminating whether a shift lever of the automatic transmission is switched from reverse range 'R' to neutral range 'N'; calculating a lapsed time when the shift lever is set at neutral range 'N', if confirmation occurs that the shift lever is switched from reverse range 'R' to neutral range 'N' at a previous step and discriminating whether the shift lever is switched from neutral range 'N' to forward drive range 'D'; and performing a shifting operation with a different shifting oil pressure depending on the lapsed time, when the shift lever is set at the neutral range 'N', if confirmation occurs that the shift lever is switched from neutral range 'N' to the forward drive range 'D' at the previous step, wherein the oil temperature of the automatic transmission of the running vehicle and the lapsed time of the shift lever set at neutral range 'N' are detected to differently control the shifting oil pressure to reduce shift shock.

4 Claims, 2 Drawing Sheets

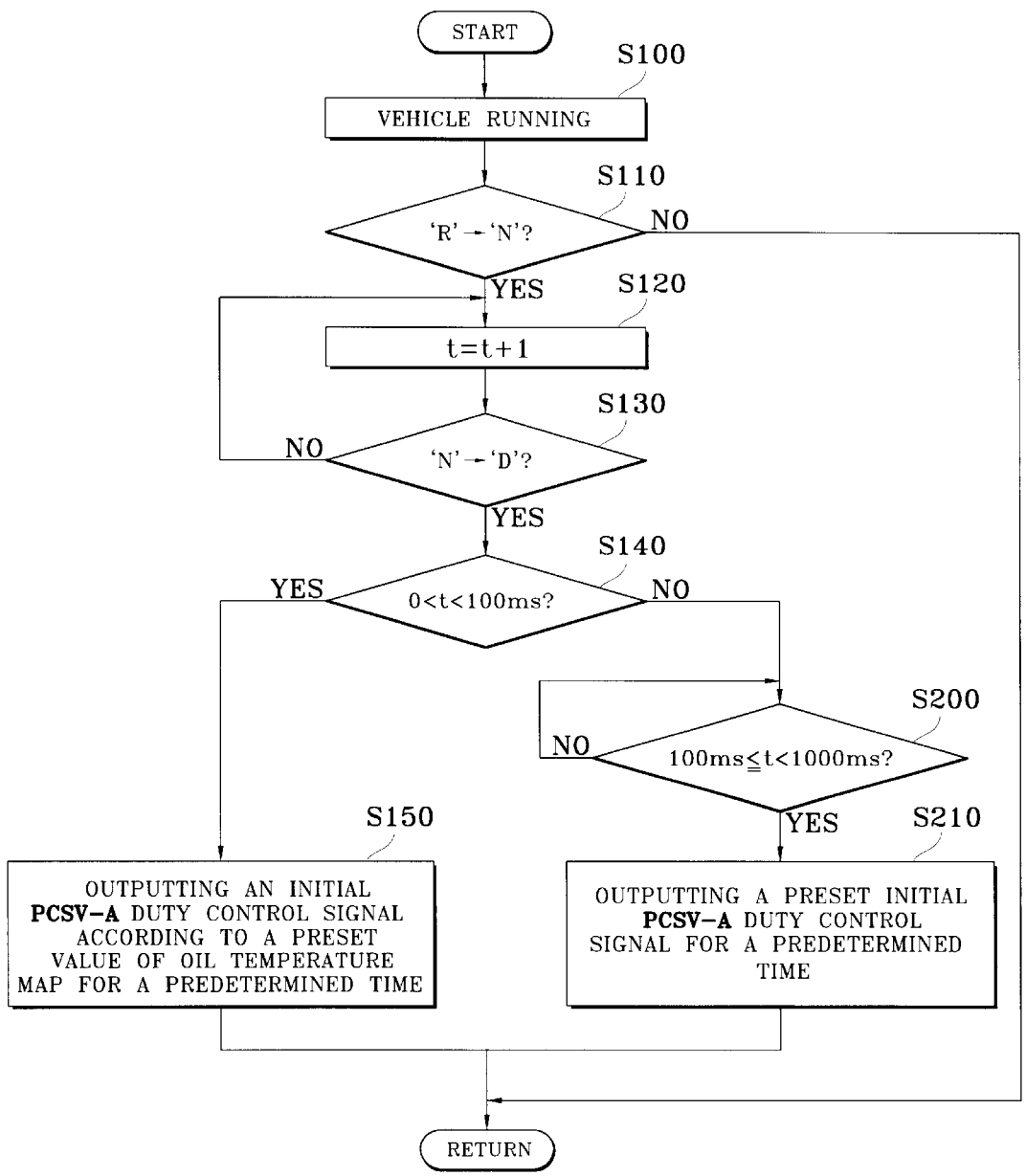

SHIFT CONTROL APPARATUS OF AUTOMATIC TRANSMISSION AND METHOD THEREFOR

BACKGROUND OF THE INVENTION

1. Field of the Invention

The present invention relates to a shift control apparatus of an automatic transmission and a method therefor, and more particularly to a shift control apparatus of an automatic transmission and a method therefor to reduce shift shock that is generated when a shift lever of an automatic transmission is switched from reverse range 'R' to forward drive range 'D' while a vehicle is at standstill.

2. Brief Description of the Prior Art

In general automatic in an transmission of a vehicle, a shift control apparatus determines a target shift level according to all detected conditions such as running speed of a vehicle, openness of a throttle valve, and control oil pressure and controls shifting operations to the target shift stage.

In a prior art automatic transmission, the shifting operations to the target shift level involve fictional elements and changing from a released state to an operational state. Shift shock is generated depending on operational states of those frictional elements.

Accordingly, a variety of techniques have been developed and applied to reduce such shift shock. For instance, in order to reduce the shift shock at the beginning and end of shifting operations when the shift lever is switched from neutral range 'N' to reverse range 'R', an accumulator is mounted onto a low/reverse brake, which is an operational element in an oil pressure circuit of an automatic transmission which buffers the oil pressure that is supplied to the low/reverse brake.

However, since the accumulator provides a buffering operation of oil pressure that is supplied to the low/reverse brake, the accumulator has a slow shift response to the release of oil pressure. If the shift lever of an automatic transmission is directly switched from reverse range 'R' to forward drive range 'D', the oil pressure of a servo-apply (S/A) is added, before oil pressure of the low/reverse brake is completely released, which results in the shift shock.

SUMMARY OF THE INVENTION

The present invention solves the aforementioned problem and provides a shift control apparatus of an automatic transmission and a method therefor to reduce shift shock by detecting a lapsed time of a shift lever set at neutral range 'N', when the shift lever is switched from reverse range 'R' to forward drive range 'D' and the oil temperature of the transmission and controlling the shifting oil pressure according to the detected values.

The present invention is a shift control apparatus of an automatic transmission of a vehicle, the apparatus comprising:

vehicle operation detecting means for checking an operational state of a vehicle;

shift control means for calculating a lapsed time of a shift lever set at neutral range 'N' when the shift lever is switched from reverse range 'R' to neutral range 'N' with an input of a signal detected by the vehicle operation detecting means and for outputting a shift control duty signal to control the shift oil pressure according to the lapsed time and the oil temperature detected by the vehicle operation means when the shift lever is switched from neutral range 'N' to forward drive range 'D'; and drive means for performing shifting operations by providing a frictional element with oil pressure duty-controlled by a shift control duty signal output by the shift control means and discharged by an oil pump.

A shift control method of an automatic transmission of a vehicle, in accordance with the invention comprises the steps of:

discriminating whether a shift lever of the automatic transmission is switched from reverse range 'R' to neutral range 'N';

calculating a lapsed time when the shift lever is set at neutral range 'N', if it is confirmed that the shift lever is switched from reverse range 'R' to neutral range 'N' at the previous step, and discriminating whether the shift lever is switched from neutral range 'N' to forward drive range 'D'; and performing shifting operations with a different shifting oil pressure depending on the lapsed time when the shift lever is set at the neutral range 'N' if it is confirmed that the shift lever is switched from neutral range 'N' to the forward drive range 'D' at the previous step.

BRIEF DESCRIPTION OF THE DRAWINGS

Objects and aspects of the invention will become apparent from the following description of a preferred embodiment with reference to the accompanying drawings in which:

FIG. 2 illustrates an operational sequence of a shift control method of an automatic transmission of a vehicle in accordance with the present invention.

DETAILED DESCRIPTION OF THE INVENTION

Figure 1:
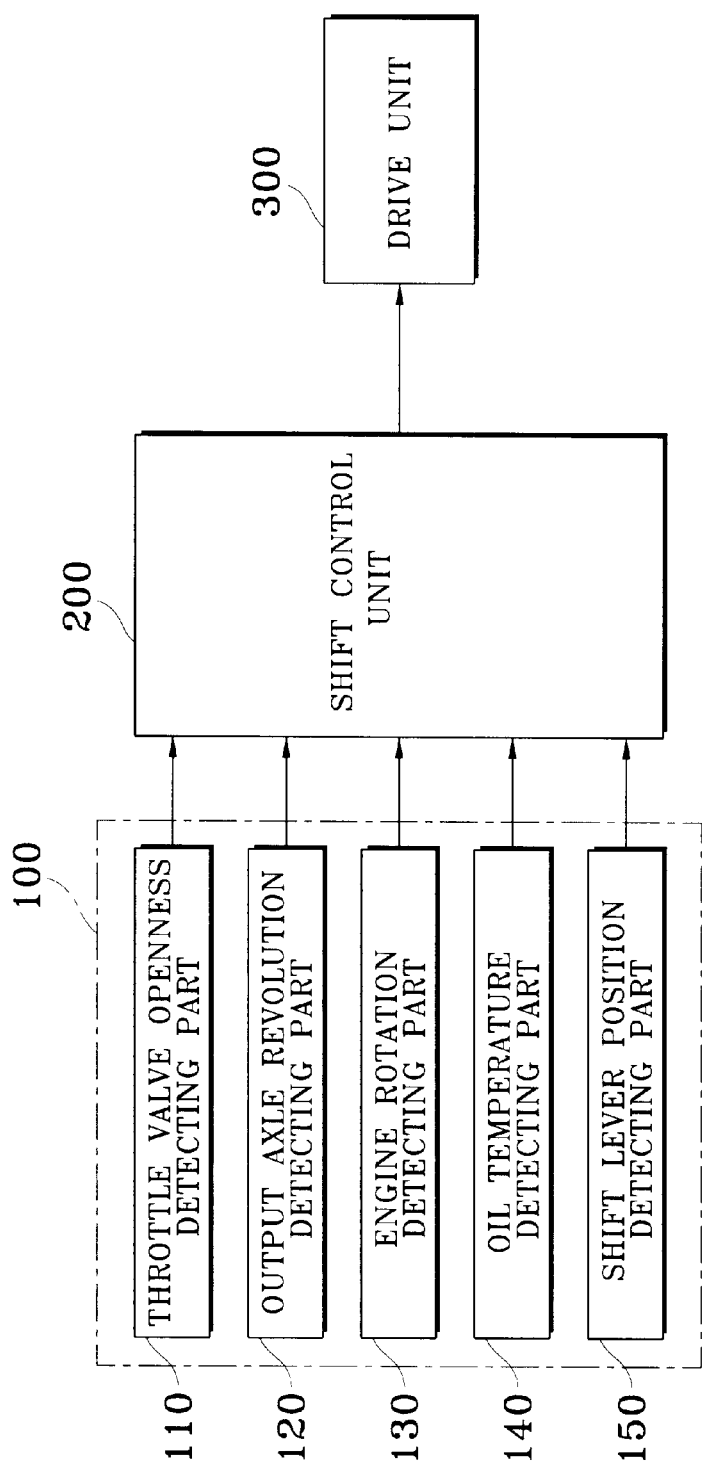
FIG. 1 is a block view for illustrating the structure of a shift control apparatus of an automatic transmission of a vehicle in accordance with the present invention.

A preferred embodiment of the present invention is described with reference to the accompanying drawings.

FIG. 1 is a block diagram of a shift control apparatus of an automatic transmission of a vehicle in accordance with the present invention, including: a vehicle operation detecting unit 100 for detecting the operational states of the vehicle which are variably output according to an operational state of a vehicle; a shift control unit 200 for calculating a lapsed time when a shift lever is set at neutral range 'N' if it is confirmed that the shift lever is switched to neutral range 'N' with an input of data such as openness of a throttle valve, revolutional speed of an output axle, engine rotational speed, oil temperature and position of the shift lever detected and output by the vehicle operation detecting unit 100 and outputs a predetermined shift control duty signal to perform shifting operations with different shifting oil pressure depending on the calculated lapse time of the shift lever at neutral range 'N' and the oil temperature detected by the vehicle operation detecting unit 100; a drive unit 300 for performing shifting operations by providing a relevant frictional element with an oil pressure duty-controlled by a predetermined shift control duty signal output by the shift control unit 200 and discharged and supplied by an oil pump.

The vehicle operation detecting unit 100 is constructed with: a throttle valve openness detecting part 110 for detecting the openness of a throttle valve to be applied when a shift level is determined with the openness of the throttle valve communicating according to a driver's manipulation of an accelerator; an output axle revolution detecting part 120 for detecting revolutional speed of an output axle of an automatic transmission corresponding the running speed of the vehicle; an engine rotation detecting part 130 for detecting and outputting rotational speed of an engine; an oil temperature detecting part 140 for detecting and outputting the oil temperature of an automatic transmission; and a shift lever position detecting part 150 for checking whether the shift lever is set at reverse, neutral and forward drive ranges 'R', 'N', 'D' depending on the driver's manipulation of the shift lever.

Now, shift control operations of an automatic transmission of a vehicle thus constructed are described in detail with reference to FIG. 2.

As described above, the vehicle operation detecting unit 100 senses the openness of a throttle valve, revolutional speed of an output axle, engine rotational speed, oil temperature and position of the shift lever.

Furthermore, the shift control unit 200 performs a shift control by a preset program with an input of openness of the throttle valve, revolutional speed of an output axle, engine rotational speed, oil temperature and position of a shift lever input from the vehicle operation detecting unit 100 to thereby run a vehicle. (S100)

During running of the aforementioned vehicle, the shift control unit 200 discriminates whether the shift lever is switched from reverse range 'R' to neutral range 'N'. (S110)

If it is confirmed that the shift lever is switched from reverse range 'R' to neutral range 'N' at step S110, the shift control unit 200 begins to calculate a lapse timed (t) when the shift lever is set at neutral range (S120), and, then, discriminates whether the shift lever is switched from neutral range 'N' to forward drive 'D' by the driver. (S130)

Then, if it is confirmed that the shift lever is switched from neutral range 'N' to forward drive range 'D' by the driver, the shift control unit 200 discriminates whether the calculated lapsed time (t) of the shift lever set at neutral range 'N' is included within preset time range 1 of 0<t<100 ms. (S140)

If the lapse time (t) of the shift lever set at neutral range 'N' is included within preset time range of 0<t<100 ms, the shift control unit 200 determines a duty value with reference to a Table of an oil temperature map preset in memory as shown in Table 1 with an input of the oil temperature of an automatic transmission detected by the vehicle operation detecting unit 100 and outputs an initial PCSV which is a duty control signal for the preset time with a duty value.

TABLE 1

| Oil temperature T | T $\leq$ 0° C. | 0° C. $\leq$ T $\leq$ 30° C. | 30° C. $\leq$ T $\leq$ 60° C. | 60° C. $\leq$ T $\leq$ 100° C. | 100° C. $\leq$ T |
|---|---|---|---|---|---|
| Duty value (Dr) | 50% | 40% | 30% | 30% | 30% |

However, if the lapsed time (t), when the shift lever is set at neutral range 'N' which is calculated at step S140 to not be included within time range 1 (0 ms<t<100 ms), the shift control unit 200 discriminates whether the lapsed time (t), when the shift lever is set at neutral range 'N', which is calculated at step S120 is included within the preset time range 2 of 100 ms$\leq$t<1000 ms. (S200)

If it is confirmed that the previously calculated lapsed time (t), when the shift lever is set at neutral range 'N', is included within the preset time range 2 of 100 ms$\leq$t<1000 ms, the shift control unit 200 outputs the preset initial PCSV which is a duty control signal to the drive unit 300 for a predetermined time. (S210)

The drive unit 300 is duty-controlled by a duty control signal output by the shift control unit 200 to control oil pressure to perform shifting operations from the current range to a driver's desired range, thereby completing shifting operations.

When the shift lever is switched by the driver's manipulation to neutral range 'N' and to forward drive range 'D' while the vehicle is driven at reverse range 'R', a shift control duty signal which varies output depending on the oil temperature of the running vehicle and the lapsed time of the shift lever set at neutral range 'N'. Therefore, it is possible to differently control the oil pressure of the drive unit 300, so that the shifting operations can be performed without any shift shock even when the shift lever is switched.

As described above, there are advantages in the shift control apparatus of an automatic transmission and a method in accordance with the present invention in that the oil temperature of the automatic transmission of the running vehicle and a lapsed time of the shift lever set at neutral range 'N' are detected to differently control the shifting oil pressure, thereby reducing a shift shock and improving a shifting function and convenience of the automatic transmission.

What is claimed is:

1. A shift control method of an automatic transmission of a vehicle, the method comprising the steps of:

determining whether a shift lever of the automatic transmission is switched from reverse range to neutral range;

determining a lapsed time when the shift lever is set at a neutral range, if confirmation occurs that the shift lever is switched from a reverse range to neutral range at a previous step and determining if the shift lever is switched from the neutral range to a forward drive range; and performing a shifting operation with a shifting oil pressure depending on the lapsed time when the shift lever is set at the neutral range if confirmation occurs that the shift lever is switched from the neutral range to the forward drive range at the previous step; and wherein the shifting operation comprises discriminating whether the lapsed time, when the shift lever is set at neutral range, is included within a first time range, and setting a shift control duty value on a basis of oil temperature of an automatic transmission and a storage of an oil temperature map and outputting a duty control signal for a predetermined time if confirmation occurs that the lapsed time of the shift lever set at neutral range is included within a first time range.

2. The method, as defined in claim 1, wherein the first time range is 0 ms<the lapsed time of the shift lever set at neutral range<100 ms.

3. The method, as defined in claim 1, wherein the shifting step comprises the steps of:

determining whether the lapsed time, when the shift lever is set at neutral range, is included within a second time range after confirmation that the lapsed time, when the shift lever is set at neutral range, is not within the first time range; and setting a stored shift control duty value and outputting a duty control signal for a predetermined time if confirmation occurs that the lapsed time of the shift lever set at neutral range is included within second time range at a previous step.

4. The method, as defined in claim 3, wherein the second time range is 100 ms<the lapsed time of the shift lever set at neutral range<1000 ms.

* * * * *